United States Patent Office 2,951,742
Patented Sept. 6, 1960

2,951,742

PROCESS FOR THE RECOVERY OF METAL HALIDES FROM THEIR ADDUCTS WITH PHOSPHORUS OXYCHLORIDE

Walter Scheller, Neuewelt, near Basel, Switzerland, assignor to Ciba Limited, Basel, Switzerland, a Swiss firm No Drawing. Filed Nov. 8, 1957, Ser. No. 695,229

Claims priority, application Switzerland Nov. 13, 1956

18 Claims. (Cl. 23—87)

This invention provides a process for the recovery of metal halides, especially chlorides of metals of the fifth group of the periodic system, by splitting adducts of the metal halides with phosphorus oxychloride.

In patent application No. 644,451, filed March 7, 1957, by Walter Scheller et al., is described a process for separating niobium compounds and tantalum compounds from one another. In that process the two chemically allied metals, niobium and tantalum, which are therefore difficult to separate from one another and which generally occur together in nature, are separated from one another by treating with phosphorous oxychloride under anhydrous conditions a mixture of halogenation products in which niobium and tantalum are present in the form of their halides, and which mixture may also contain the halides of accompanying elements, and separating from one another the addition compounds so formed by fractional distillation. Although this method of separation takes place smoothly and is entirely suitable for the separation of niobium and tantalum from mixtures containing them, the recovery of the metal halides from the separated phosphorus oxychloride-metal halide adducts is attended by a few difficulties. Thus, for example, the method of recovering the metal halides described in the aforesaid specification by splitting the adducts by means of a solvent or with incandescent carbon leads to niobium and tantalum pentachlorides which contain phosphorus and are therefore undesirable for many industrial purposes.

The present invention is based on the observation that practically phosphorus-free halides of metals of the fifth group of the periodic system can be obtained from phosphorus oxychloride adducts of these metal halides by reacting the adduct with an alkali metal halide which forms a stable double salt with the metal halide constituent of the adduct at low temperatures, and thermally decomposing the resulting double salt after removing therefrom the phosphorus oxychloride liberated in the said reaction.

The phosphorus oxychloride adducts of metal halides of elements of the fifth group of the periodic system used as starting materials in the present process can be obtained by methods in themselves known, for example, by reacting phosphorus oxychloride with the pentachlorides of niobium and tantalum.

Niobium pentachloride and/or tantalum pentachloride may be reacted with phosphorus oxychloride, for example, by dissolving the solid pentachloride or pentachlorides in liquid phosphorus oxychloride at the ordinary or a raised temperature, and removing the excess of phosphorus oxychloride, for example, by evaporation. Alternatively phosphorus oxychloride vapour may be brought into contact with the solid pentachloride or pentachlorides, or phosphorus oxychloride vapour may be reacted with the vapour of niobium pentachloride and/or tantalum pentachloride, whereupon the adducts are formed during the condensation of the vapours.

The addition compounds of phosphorus oxychloride with niobium pentachloride and/or tantalum pentachloride so obtained are solid compounds at ordinary temperature, which have lower melting points than those of the pentachlorides used as starting materials. The constitution of the addition products has not been fully ascertained. However, analysis has shown that there are formed, inter alia, 1:1-adducts of the metal pentachlorides with phosphorus oxychloride. The adducts are generally prepared industrially from mixtures of chlorination products which are obtained, for example, by the chlorination of materials which contain niobium and tantalum in oxidised form, for example, slags or especially concentrates or ores, which may be after-treated for the purpose of enrichment, or by the chlorination of mixtures of oxides of the aforesaid metals. The chlorination of the aforesaid materials is carried out with chlorine gas and a reducing agent, such as carbon, or with carbon tetrachloride by methods in themselves known. In order to prepare from such mixtures of chlorination products adducts to be treated by the process of this invention the crude chlorination mixture is advantageously dissolved in phosphorus oxychloride. The phosphorus oxychloride addition compounds of the chlorides of zirconium and titanium, which chlorides may be present as impurities in the chlorination mixture, are relatively sparingly soluble in the solvent and separate out in crystalline form, and, if they are present in sufficient quantity, can easily be removed, for example, by filtration. After separating the phosphorus oxychloride adducts insoluble in phosphorus oxychloride, the excess solvent may be removed by distillation, whereby the phosphorus oxychloride addition compounds with the metal halides used as starting materials, especially niobium pentachloride-phosphorus oxychloride adducts and tantalum pentachloride-phosphorus oxychloride adducts remain behind as a solid residue, and these adducts can be separated from one another by fractional distillation.

The reaction of the phosphorus oxychloride products so obtained with alkali metal halides to produce double salts which are stable at low temperature, that is to say, at temperatures up to about 500° C., may be carried out under superatmospheric or atmospheric pressure. The reaction is advantageously carried out with the exclusion of moisture and in an inert atmosphere, for example, in a dry atmosphere of nitrogen or carbon dioxide. It is desirable, especially in carrying out the reaction with niobium adducts, to work under conditions as free as possible from oxygen and moisture, for example, by using oxygen-free dry alkali metal halides. The reaction must of course be carried out at a temperature below the decomposition temperature of the double salt to be formed, that is to say, below 500° C. It is, however, of advantage to use a temperature above the boiling point of phosphorus oxychloride so that the phosphorus oxychloride liberated can easily be removed in the gaseous condition from the solid double salt.

Thus, for example, the adduct vapours diluted with an inert carrier gas, such as nitrogen, may be reacted at 280° C. to 500° C. with potassium chloride in a shaft furnace or tubular furnace to form the double salts of potassium chloride with niobium pentachloride and tantalum pentachloride, respectively. The potassium chloride may be present in the furnace, for example, alone or diluted by an inert solid carrier, such as carbon. The phosphorus oxychloride so liberated is condensed from the issuing gases and can be used directly for preparing further adducts. When the evolution of phosphorus oxychloride is complete, the temperature of the furnace is raised to above 500° C., for example, to 600–800° C., whereupon the double salt undergoes thermal splitting and phosphorus-free niobium pentachloride and tantalum pentachloride are recovered as sublimates. By the use of two "moving beds," one of which is at a temperature within the range of 280–500° C. for the formation of double salt and the recovery of phosphorus oxychloride and the other of which is at a temperature within the range of 500–800° C. for thermal decomposition of the double salt, the process may be carried out in a continuous manner. By applying the potassium chloride to an inert support or by diluting the potassium chloride with an inert mass, for example, carbon, the risk of caking can be avoided.

As the process can be carried out with any alkali metal halide, potassium fluoride or sodium fluoride may be used instead of potassium chloride. The double salt can also be formed by carrying out the reaction between liquid and solid phases, instead of between gaseous and solid phases. To this end, for example, anhydrous potassium chloride may be heated with the molten adducts or in the presence of an inert solvent, such as thionyl chloride.

For making the double salt the proportion of alkali metal halide, for example, alkali metal chloride, is so chosen that one molecular proportion of alkali metal halide is present for each molecular proportion of metal halide present in the phosphorus oxychloride adduct.

After separating the liberated phosphorus oxychloride and any solvent that may be used, the double salt so formed is subjected to thermal splitting at a temperature above 500° C., and advantageously at a temperature within the range of 600–800° C., whereby the pure, substantially phosphorus-free halides are obtained in the form of a sublimate, and the potassium chloride remains behind as solid residue. It is desirable to work under oxygen-free conditions, if it is desired to avoid the formation of oxychlorides. The thermal decomposition of the double salt may also be carried out under reduced pressure. It is especially advantageous to use an oxygen-free gaseous current.

After the decomposition of the halide-phosphorus oxychloride adducts and separation of the phosphorus oxychloride, the phosphorus oxychloride recovered can be used for reaction with further halide mixtures containing niobium and tantalum. Likewise, the residual alkali metal halide from the thermal splitting can easily be returned to the process. Thus, in a cyclic process by starting from the halide mixture there can be obtained by way of the phosphorus oxychloride adducts, for example, of niobium or tantalum halides, the corresponding substantially pure phosphorus-free halides, and it is necessary to supply freshly to the process only the quantities of niobium and tantalum halides consumed and, when necessary, any losses of phosphorus oxychloride or alkali metal halide.

The halides of metals of the fifth group of the periodic system obtained by the process of this invention may be distilled or sublimed for further purification. However, there are usually obtained from the double salts, as the result of the sublimation which accompanies decomposition, pure halides, which generally contain less than 0.01% of phophorus.

The following examples illustrate the invention, the parts and percentages being by weight unless otherwise stated and the relationship of parts by weight to parts by volume being the same as that of the kilogram to the liter:

*Example 1*

15 parts of the adduct of tantalum pentachloride and phosphorus oxychloride ($TaCl_5.POCl_3$) are dissolved in 150 parts by volume of thionyl chloride, and 5 parts of anhydrous finely pulverised potassium chloride are added to the solution. The mixture is heated in an atmosphere of carbon dioxide for one hour under reflux, and is then filtered with the exclusion of moisture. The filtrate is evaporated to dryness and the residue is completely dried by heating it at 100° C. under reduced pressure (15 mm. of mercury).

By heating the residue in a current of nitrogen at 600° C. there are obtained 10.2 parts of tantalum pentachloride having a phosphorus content of less than 0.01%, on the weight of the pentachloride calculated as $Ta_2O_5$. The phosphorus oxychloride is recovered by fractional distillation of the thionyl chloride.

By using a corresponding quantity of the adduct of niobium pentachloride and phosphorus oxychloride, instead of the tantalum pentachloride adduct, there is obtained substantially pure niobium pentachloride, of which the phosphorus content is likewise below 0.01%.

*Example 2*

25 parts of $TaCl_5.POCl_3$ adduct are treated in a vessel fitted with a reflux condenser and dephlegmator in an atmosphere of carbon dioxide under reflux with 10 parts of dried finely pulverised potassium chloride, the temperature of the potassium chloride being 350° C. and the temperature of the dephlegmator 210° C. The apparatus is so constructed that the vapours condensed to liquid in the dephlegmator fall dropwise directly into the heated potassium chloride. The phosphorus oxychloride liberated during the reaction passes through the dephlegmator and are condensed separately. 7.2 parts of phosphorus oxychloride are collected, and the latter can be used directly for the production of fresh adduct.

When the reaction is finished, the mixture of potassium tantalum chloride double salt and excess of potassium chloride is slowly heated in a dried oxygen-free current of nitrogen to 600° C. 16.5 parts of tantalum pentachloride sublime having a phosphorus content of less than 0.01%.

The use of $NbCl_5.POCl_3$ adduct gives analogous results.

*Example 3*

20 parts of $TaCl_5.POCl_3$ adduct are reacted with potassium chloride by passing it in a stream of dried oxygen-free nitrogen as carrier gas through a layer, heated at 370° C., of dried granular potassium chloride 250 mm. long and 15 mm. in diameter. The phosphorus oxychloride and small amounts of $TaCl_5.POCl_3$ are condensed from the issuing gases. When all the liberated phosphorus oxychloride has been blown out of the potassium chloride, the temperature is slowly raised to 550° C., whereupon tantalum pentachloride is evolved from the double salt.

There are obtained, 13.2 parts of tantalum pentachloride and 5.8 parts of phosphorus oxychloride containing small amounts of $TaCl_5.POCl_3$. The phosphorus oxychloride containing small amounts of adduct can be used directly for the production of fresh adduct.

By using a corresponding quantity of $NbCl_5.POCl_3$ adduct, substantially pure niobium pentachloride is obtained in an analogous manner.

*Example 4*

132 grams of distilled phosphorus oxychloride adduct of tantalum pentachloride and 31 grams of anhydrous finely pulverised potassium fluoride are heated in the course of one hour to 200° C. in a current of oxygen-free dry nitrogen, phosphorus oxychloride distilling over when the temperature reaches about 150° C. When the reaction mixture has been maintained at 200° C. for a further hour, the temperature is raised in the course of ½ hour to 300° C.

In order to recover the phosphorus-free tantalum pentachloride, the residue is decomposed in nitrogen at 500° C. Alternatively, the phosphorus-free residue consisting of the double salt of potassium fluoride and tantalum pentachloride ($2KF.1TaCl_5$), possibly after being diluted with an alkali metal halide or alkaline earth metal halide may be used directly in a melt for the recovery of tantalum by electrolysis.

Example 5

120 grams of phosphorus oxychloride adduct of niobium pentachloride and 30 grams of anhydrous finely pulverized potassium fluoride are heated in a current of pure nitrogen for one hour at 180° C., and after a further ½ hour the temperature is raised to 400° C.

In order to recover the phosphorus-free niobium pentachloride the double salt ($2KF \cdot 1NbCl_5$) is subjected to thermal decomposition at 500° C. in a current of pure nitrogen. There remains behind a blue residue containing niobium apparently partially in the tetravalent oxidation stage, which residue can be completely decomposed in an atmosphere of chlorine with the oxidation of the niobium.

The resulting phosphorus-free residue consisting of potassium fluoride, and niobium pentachloride or niobium tetrachloride, is suitable for use in melts for the electrolytic production of niobium.

What is claimed is:

1. A process for the recovery of the pentachloride of a metal selected from the group consisting of niobium and tantalum from the adduct of said pentachloride with phosphorus oxychloride comprising the steps of reacting said adduct under substantially oxygen-free and moisture-free conditions with an alkali metal halide selected from the group consisting of potassium chloride and potassium fluoride, separating the phosphorus oxychloride liberated by the reaction and subjecting the resulting double salt to thermal decomposition.

2. A process for the recovery of the pentachloride of a metal selected from the group consisting of niobium and tantalum from the adduct of said pentachloride with phosphorus oxychloride comprising the steps of reacting said adduct under substantially oxygen-free and moisture-free conditions with an alkali metal halide selected from the group consisting of potassium chloride and potassium fluoride, separating the phosphorus oxychloride liberated by the reaction and subjecting the resulting compound to thermal decomposition.

3. A process according to claim 1 wherein the double salt is formed by reacting the adduct in vapour form with solid alkali metal halide.

4. A process as claimed in claim 1 wherein the formation of the double salt is carried out at a temperature not exceeding 500° C.

5. A process as claimed in claim 4, wherein the said temperature is within the range of 150–450° C.

6. A process as claimed in claim 1, wherein the thermal decomposition of the double salt is carried out at a temperature of at least 500° C.

7. A process as claimed in claim 6, wherein the said temperature is within the range of 600° C. to 700° C.

8. A process as claimed in claim 1, wherein at least one molecular proportion of the alkali metal halide is used for each molecular proportion of the metal halide present in the adduct.

9. A process as claimed in claim 1, wherein the double salt is formed by reacting the adduct in liquid form with solid alkali metal halide.

10. A process as claimed in claim 1, wherein the double salt formation is carried out in the presence of an inert solvent.

11. A process as claimed in claim 3, wherein the vapour of the adduct is diluted with an inert gas.

12. A process as claimed in claim 1, wherein the potassium chloride used is supported on a carrier material.

13. A process according to claim 10 wherein the inert solvent is thionyl chloride.

14. A process according to claim 1 wherein the alkali metal halide is potassium chloride and wherein the potassium chloride is diluted with a solid diluent.

15. A process according to claim 14 wherein the solid diluent is carbon.

16. A continuous process for the recovery of the pentachloride of a metal selected from the group consisting of niobium and tantalum from the adduct of said pentachloride with phosphorus oxychloride comprising the steps of reacting said adduct under substantially oxygen-free and moisture-free conditions with potassium chloride, thus forming a potassium chloride double salt, separating the phosphorus oxychloride liberated from the reaction and returning said phosphorus oxychloride to the process for making fresh adduct, subjecting the potassium chloride double salt to thermal decomposition, separating the halides that sublime and returning the residual potassium chloride to the process.

17. The double salt of niobium pentachloride with potassium fluoride having the formula $2KF \cdot 1NbCl_5$.

18. The double salt of tantalum pentachloride with potassium fluoride having the formula $2KF \cdot 1TaCl_5$.

References Cited in the file of this patent

Proceedings of the American Philosophical Society, vol. 44 (1905), page 204.

"Thermal and Tensimetric Study of the System $$TaCl_5 - AlCl_3 - CsCl"$$

I. S. Morozov and A. T. Simonich, Zhur. Neorg. Khim., vol. 2, pages 1907–14 (August 1957).

I. S. Morozov and A. T. Simonich, Zhur. Neorg. Khim., vol. 1, pages 145–157 (January or February 1956).

Mellor: "Comprehensive Treatise on Inorganic and Theoretical Chemistry," vol. 9, pp. 871 and 915, Longmans, Green and Co. New York (1929), pages 878, 879.

Friend: "Textbook of Inorganic Chemistry," vol 6, part III, pp. 150, 152, 194. Publ. by Charles Griffin and Co., London (1929).